United States Patent [19]

Ortwein et al.

[11] Patent Number: 4,637,646
[45] Date of Patent: Jan. 20, 1987

[54] WHEEL SET FOR RAIL VEHICLES

[75] Inventors: Hermann Ortwein, Cologne; Ottmar Krettek; Johannes Nicolin, both of Aachen, all of Fed. Rep. of Germany

[73] Assignee: Clouth Gummiwerke Aktiengesellschaft, Cologne, Fed. Rep. of Germany

[21] Appl. No.: 672,576

[22] Filed: Nov. 16, 1984

[30] Foreign Application Priority Data

Nov. 21, 1983 [DE] Fed. Rep. of Germany ....... 3341950

[51] Int. Cl.$^4$ ............................................. B60B 37/00
[52] U.S. Cl. ...................................... 295/37; 295/36 R
[58] Field of Search ..................... 295/36 A, 36 R, 37, 295/38, 39, 40; 301/124 R, 124 H; 464/180, 24, 27; 105/131

[56] References Cited

U.S. PATENT DOCUMENTS

| 565,938 | 8/1896 | Sperry | 105/131 |
|---|---|---|---|
| 1,635,551 | 7/1927 | Kasley | 105/131 |
| 1,727,055 | 9/1929 | Fletcher et al. | 105/131 |
| 1,734,043 | 11/1929 | Nelson | 464/27 |
| 1,751,496 | 3/1930 | Sandner | 464/27 |
| 1,832,285 | 11/1931 | Elmer | 464/180 |
| 2,574,129 | 11/1951 | Spaleny | 464/24 |
| 2,691,283 | 10/1954 | Stover | 464/180 |
| 2,727,780 | 12/1955 | Lorig et al. | 295/36 R |
| 3,626,862 | 12/1971 | Korn et al. | 295/36 R |
| 4,095,530 | 6/1978 | Korber et al. | 105/131 |
| 4,160,390 | 7/1979 | Spaetgens | 464/24 |
| 4,170,945 | 10/1979 | Kayserling | 105/131 |
| 4,411,637 | 10/1983 | Rauch | 464/180 |

FOREIGN PATENT DOCUMENTS

| 455900 | 4/1949 | Canada | 464/27 |
|---|---|---|---|
| 2350020 | 4/1975 | Fed. Rep. of Germany . | |
| 2614166 | 10/1977 | Fed. Rep. of Germany . | |
| 2848398 | 11/1979 | Fed. Rep. of Germany . | |
| 2029223 | 12/1982 | Fed. Rep. of Germany | 464/180 |
| 2248740 | 5/1975 | France | 464/24 |
| 1258 | of 1861 | United Kingdom | 295/36 R |

Primary Examiner—Robert B. Reeves
Assistant Examiner—Dennis C. Rodgers
Attorney, Agent, or Firm—Karl F. Ross; Herbert Dubno

[57] ABSTRACT

A wheel set for railway vehicles, especially high speed railway vehicles in which hollow shaft sections on a shaft are connected by an elastic coupling for limited relative angular displacement of the wheels. The elastic coupling is of the deformable elastomeric, viscoelastic or hydraulic type.

7 Claims, 3 Drawing Figures

WHEEL SET FOR RAIL VEHICLES

FIELD OF THE INVENTION

Our present invention relates to a wheel set for railway vehicles and, more particularly, to a wheel set for railway trucks and the like in which the wheels of a given axle are elastically coupled together for limited relative angular displacement.

BACKGROUND OF THE INVENTION

A "wheel set" for a railway truck or undercarriage adapted to be used on railroad cars or the like, generally comprises a pair of flanged wheels rotatable about a common axis. When it is desirable to elastically couple these wheels, the wheel set may be used to advantage for railway carriages or cars operating at high speed, the elastic coupling contributing to a uniform travel of the wheel set along the track and compensating for the negative effects of unavoidable differences in rail orientation and like factors.

In one conventional arrangement of the latter type, each of the two wheels is mounted upon a respective shaft and the two shafts are coupled together so that torque can be transmitted from one shaft to the other (see German open application - Offenlegungsschrift DE-OS No. 23 50 020).

The torque transfer is here effected by an assembly of elements which can be journaled in an intermediate support structure extending longitudinally in the direction of travel and provided on truck or undercarriage in which the wheel set is journaled.

The problem with such wheel sets is that they can be used only in trucks especially designed for the particular wheel set and constructed to support the torque transfer means.

It has also been proposed to mount the two wheels of the wheel set so that they are individually rotatable upon a common shaft. In this case, the two wheels are interconnected by respective portions of a divided hollow shaft journaled on the first-mentioned shaft. Arrangements of this type are illustrated and described in German open application - Offenlegungsschrift DE-OS No. 26 14 166 and in German printed application - Auslegeschrift DE-AS No. 28 48 398. The hollow shaft parts are connected together by a coupling affording slip between them, the slip being increased by a controller as the speed increases and being reduced as the speed of the wheel set diminishes.

These arrangements have been found to be expensive to fabricate and maintain and also show a tendency toward failure or toward unreliability. Furthermore, a certain angular relationship of the two wheels cannot be ensured.

OBJECTS OF THE INVENTION

It is the principal object of the present invention to provide an improved wheel set for railway vehicles which obviates the disadvantages enumerated above.

Another object of this invention is to provide an improved wheel set which affords elastic connection of the two wheels without, however, eliminating a given angular relationship therebetween.

Yet a further object of this invention is to provide a wheel set for the aforedescribed purposes which can be accommodated in practically any undercarriage truck for railway cars and which allows self-compensation of the angular relationship of the two wheels for all operating conditions.

SUMMARY OF THE INVENTION

These objects and others which will become apparent hereinafter are attained, in accordance with the present invention in a wheel set which comprises a support shaft, respective wheels spaced apart along this shaft and connected to respective hollow shaft sections, and intermediate these wheels, an elastic coupling securing the hollow shaft section together with limited elastic yieldability in an angular sense, i.e. relative limited angular displacement with self restoration of the normal angular orientation.

Preferably, each of the hollow shaft sections is connected by a flange to the respective wheel, i.e. is flanged thereto. According to another feature of the invention, the elastic coupling between the hollow shaft sections is an elastomeric coupling, i.e. interposes between relatively angularly displaceable members an elastomerically deformable body. Viscoelastic or hydraulic elements can be used to the same end if desired.

With the system of the invention, the original angular orientation is self-restoring and, although relative angular displacement is permitted, this angular displacement is limited and is against a resetting force in all cases which return the parts to their original angular orientations.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
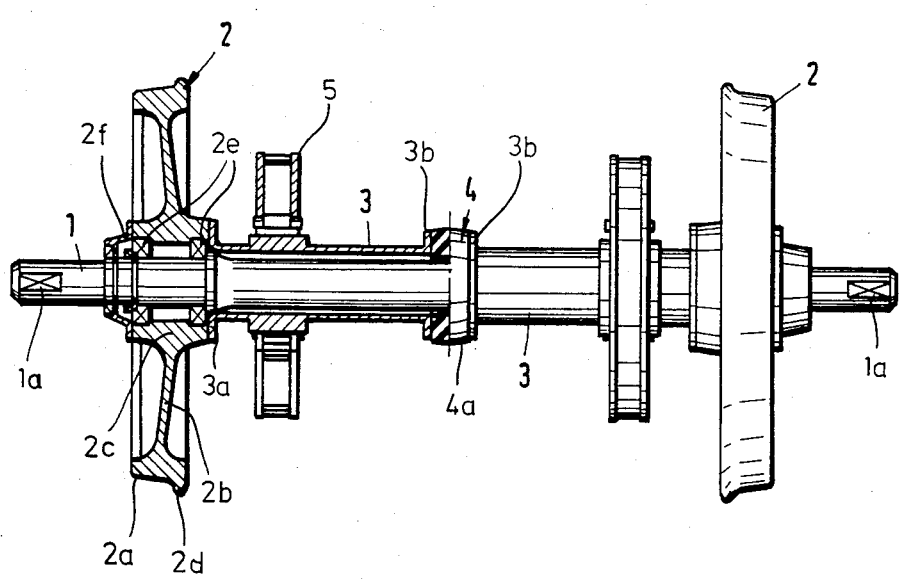
FIG. 1 is an elevational view of a wheel set according to the invention, the lefthand of which is shown in axial section, for a wheel set embodying the invention in its best mode form.

In FIG. 1 we have shown a wheel set which comprises a shaft 1 which can be held against rotation in the end supports of a railway truck, flats 1a being provided on the ends of the shaft 1 so that the shaft may be immobilized. A pair of wheels 2 are axially spaced apart and journaled on the shaft 1. Each wheel 2 has the usual self-centering running surface 2a connected by a web 2b to a hub 2c and provided with a flange 2d which prevents the wheels from leaving the conventional roalroad truck. A pair of bearings 2e journals the hub upon the shaft 1 for each wheel and a seal 2f is provided to prevent contamination of the bearings in the usual manner.

Each hub 2c is connected to a flange 3a, e.g. by bolts not shown, of a hollow shaft section 3 extending inwardly from the wheel. The hollow shaft sections 3 can carry auxiliary wheels 5 which facilitate lifting of the wheel set into the carriage when the wheels 5 ride on respective ramps. When the wheel set is driven, an appropriate drive wheel can be provided at each location of the wheel 5.

The two hollow shaft sections 3 are interconnected by an elastic element represented generally at 4 and allowing limited relative angular displacement of the two hollow shaft sesctions and hence the wheels 2 at a location centrally disposed between the wheels as can be seen from FIG. 1.

In the embodiment illustrated, the coupling 4 comprises a body of elastomeric material 4a which is vulcanized to the two flanges 3b of the hollow shaft sections 3.

Figure 2:
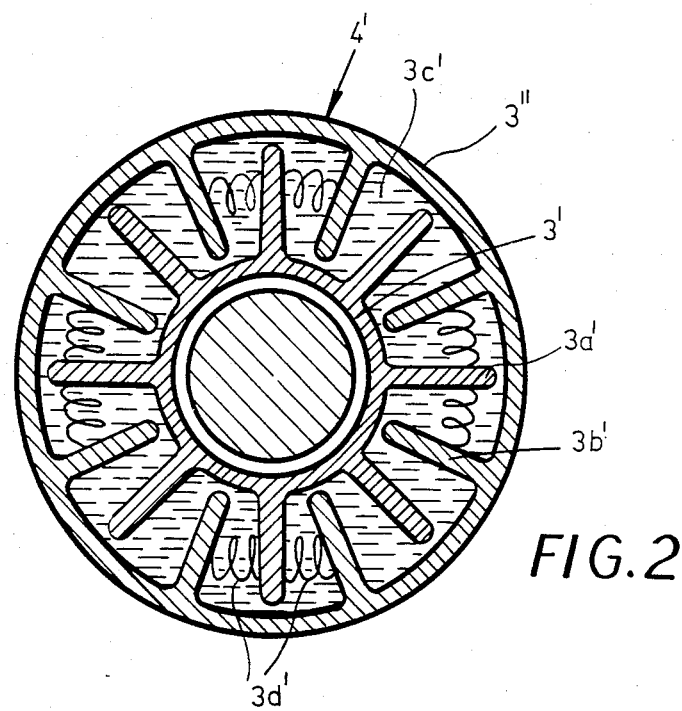
FIG. 2 is a transverse section through a viscoelastic coupling which can be substituted for the elastomeric coupling of the embodiment of FIG. 1.

In the embodiment of FIG. 2 a viscoelastic element 4' serves to couple the confronting flanges of the hollow shaft sections together.

One of the hollow shaft sections 3' is here formed with radially outwardly extending vanes 3a' which interdigitates when the inwardly extending vanes 3b' of the other hollow shaft section 3" which forms a housing enclosing the vanes. Small clearances are provided at the ends of the vanes and the compartment is filled with a viscous fluid 3c'.

The vanes are urged into their original positions or mutual orientations by springs 3d' shown only diagrammatically when a torque differential is established between the wheels 2 in FIG. 1, the elastomeric body 4a deforms.

In this embodiment, however, when a torque differential is established, the two hollow shaft sections move relatively angularly and displace the fluid from one side of a vane to the opposite side wheel stressing the springs so that viscoelastic coupling is provided which automatically restores the original orientation when the torque differentiation terminates.

Figure 3:
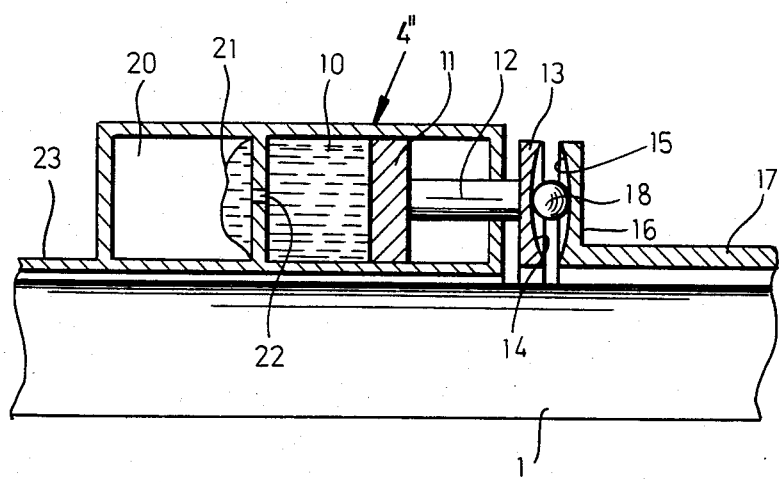
FIG. 3. is a fragmentary axial section illustrating a hydraulic coupling which may be used in place of the viscoelastic or elastomeric couplings between the hollow shaft sections.

The hydraulic approach has been illustrated in FIG. 3 with a similar effect. In this case, an annular hydraulic cylinder 10 is provided for the coupling 4" and includes an annular piston 11 which has angularly equispaced rods 12 carrying an annular disk 13 surrounding the shaft 1. The disk 13 has spaced apart dimples 14 which, together with the dimples 15 in a flange 16 of the other hollow shaft section 17 receive a ball 18. Such balls are angularly equispaced about the shaft 1. The cylinder 10 communicates with a pressure accumulator 20 in which the liquid phase is separated from the air phase by a membrane 21, via the orifice 22. The hollow shaft flange bearing the cylinder has been represented at 23.

In operation, when a torque differential as previously described is established between the two shaft sections, the annular disks 13 and 16 tend to rotate relatively slightly, disaligning the dimples and causing the balls 18 to press the piston 11 to the left, thereby increasing the pressure in the accumulator This pressure has an elastic force which tends to restore the original orientation of the two shaft sections

We claim:

1. A torsionelastic wheel set for a railway vehicle comprising:
    a shaft;
    a pair of axially spaced track-entrained railroad-rail wheels independently journaled on said shaft and rotatable relative to said shaft and to one another;
    respective hollow shaft sections connected to each of said wheels and disposed between said wheels, said shaft extending through said sections, said shaft sections being cylindrical and extending toward a location substantially centrally disposed between said wheels, each of said shaft sections having a flange adjoining said location; and
    an annular elastic coupling at said location between said hollow shaft sections coaxial therewith and securing them together substantially midway between the wheels for limited elastic relative angular displacement and generating a restoring force reestablishing an original angular orientation of said hollow shaft sections, said coupling being axially sandwiched between said flanges.

2. The wheel set defined in claim 1 wherein said elastic coupling includes an elastomeric body deformable upon relative angular displacement of said hollow shaft sections.

3. The wheel set defined in claim 1 wherein said coupling is a viscoelastic coupling.

4. The wheel set defined in claim 1 wherein said hollow shaft sections are flanged to the respective wheels.

5. The wheel set defined in claim 4 wherein each of said wheels has a hub journaled on said shaft by a pair of bearings.

6. The wheel set defined in claim 5 wherein said elastic coupling includes an elastomeric body deformable upon relative angular displacement of said hollow shaft sections.

7. The wheel set defined in claim 5 wherein said coupling is a viscoelastic coupling.

* * * * *